June 22, 1926.
J. E. ROULLARD
FOOD DISPENSER
Filed June 15, 1925
1,589,565
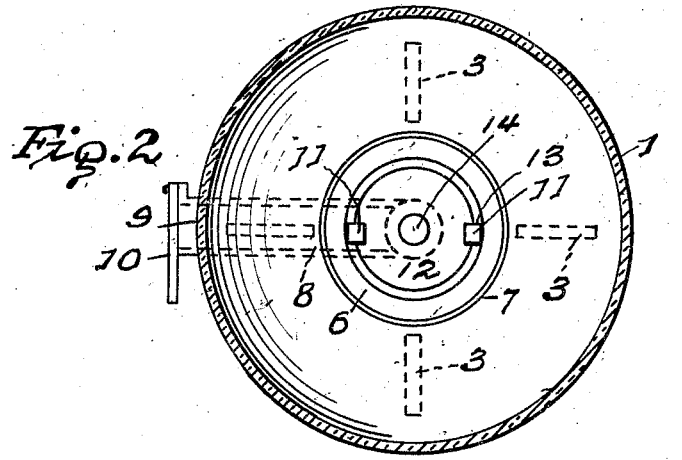
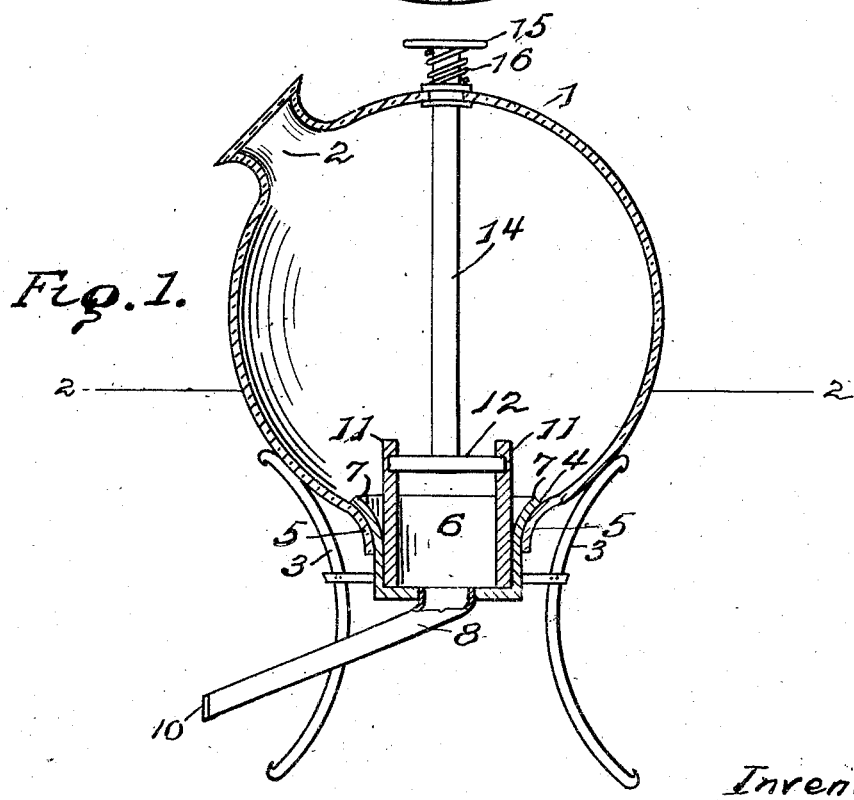
Inventor
J. E. Roullard
by J. P. Gorin atty Patented June 22, 1926.

1,589,565

UNITED STATES PATENT OFFICE.

JOEL ERNEST ROULLARD, OF SEATTLE, WASHINGTON.

FOOD DISPENSER.

Application filed June 15, 1925. Serial No. 37,368.

This invention relates to an improvement in dispensing devices designed more particularly to dispense predetermined quantities of fluid or semi-fluid food, such for example, as mayonnaise or the like.

In dispensing food products of this nature, particularly for sale, there is considerable loss due to drip and unsanitary and unsatisfactory condition of the article used in measuring the quantity to be dispensed. The present invention is designed with a view to avoiding these objections by permitting the delivery of a predetermined quantity of the food product without succeeding drip or the exterior accumulation of any of the material, and to this end, the invention comprises a container in which the food product is held in bulk, and having a measuring vessel in the lower portion thereof, from which vessel extends a delivery conduit terminating in a cut-off. A manually operable plunger carries an expressing disc, which in the operation of the plunger is adapted to fit into the measuring vessel and force the material therein through the conduit for delivery.

The invention is illustrated in the accompanying drawings, in which:

Fig. 1 is a view in vertical section of the improved dispensing device.

Fig. 2 is a section on line 2—2 of Fig. 1.

The improved dispensing device includes a receptacle 1, preferably of glass and of globular form, and of a size to contain a considerable quantity of the food product to be dispensed, which may be introduced into the receptacle through an opening 2 adapted to be closed when not in use. The receptacle as a whole is supported upon legs 3, and is formed in its lower end with an opening 4 having a marginal outturned flange 5. A cup-like measure 6 is fitted within the opening 4, said measure being open at the upper end and having its edge outturned at 7 to overlie the edge of the receptacle 1 and seal the juncture between the receptacle and measure. The measure 6 has an outlet in the bottom communicating with a conduit 8 which leads to one side and terminates in a discharge opening 9, controlled by a gate valve or cut-off 10, through the use of which, the outlet from the conduit may be readily closed against the possibility of drip.

Opposing guide bars 11 are secured in the measure 6, rising above the upper end of the measure to slidably receive an expressing disc 12, the edge of which is notched at 13 to slidably cooperate with the bars. The disc 12 is secured to a rod 14, which extends through the upper end of the receptacle 1 and is provided with an operating knob 15, between which and the upper end of the receptacle is arranged a spring 16, tending to hold the disc 12 in an elevated position with respect to the measure. Obviously, the desired food product when placed in the receptacle 1, will fill the measure and conduit 8, and when desired to dispense a quantity of such food product, the receiving vessel is placed below the delivery end of the conduit, the gate valve 10 open, and pressure exerted upon the knob 15. The expressing disc 12 is thus forced to the lower end of the measure 6, expressing the contents thereof through the conduit and into the receiving vessel. On closing the gate 10, the conduit is completely closed against delivery and the cooperation of the gate is such that no drip follows the closing action.

Obviously, with a sufficient quantity of food product within the container 1, the same quantity will be expressed at each action described. Thus the retailer may without particular care on his part deliver to the container the required quantity of product at each operation.

Claims:

1. A dispensing apparatus including a globular receptacle having an opening in its lower portion, a measure fitted within said opening and extended beyond the receptacle, a conduit leading from the measure, an expressing disc of a size to fit within the measure, means carried by the measure for supporting the disc above the mouth of the measure and in line with said mouth, and means for operating the expressing disc to force the material from the measure and through the conduit.

2. A dispensing apparatus including a globular-form receptacle, a measure carried by the receptacle and projecting beyond the same, a conduit leading from the measure, a cut-off for the delivery end of the conduit, guide rods rising from the measure, an expressing disc having a diameter approximating that of the interior of the measure slidably cooperating with said guide rods, a rod secured to the disc and extending through the receptacle, and a spring for maintaining the rod and disc in a position above the measure.

In testimony whereof I affix my signature.

JOEL ERNEST ROULLARD.